United States Patent
Li et al.

(10) Patent No.: US 8,376,621 B2
(45) Date of Patent: *Feb. 19, 2013

(54) WASHER AND MOTOR BEARING SYSTEM COMPRISING THE SAME

(75) Inventors: Yingcheng Li, Zhongshan (CN); Shen Zhang, Zhongshan (CN)

(73) Assignee: Zhongshan Broad-Ocean Motor Manufacturing Co., Ltd., Zhongshan (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/249,214

(22) Filed: Sep. 29, 2011

(65) Prior Publication Data

US 2012/0020601 A1  Jan. 26, 2012

Related U.S. Application Data

(63) Continuation of application No. PCT/CN2010/070299, filed on Jan. 21, 2010.

(30) Foreign Application Priority Data

Mar. 31, 2009  (CN) .................. 2009 2 0054053 U

(51) Int. Cl.
  *F16N 1/00* (2006.01)
(52) U.S. Cl. ........................................ 384/397; 384/368

(58) Field of Classification Search .................. 384/166, 384/167, 286, 288, 289, 322, 368, 369, 371, 384/375–377, 397, 400; 184/100
See application file for complete search history.

(56) References Cited

U.S. PATENT DOCUMENTS

| | | | | |
|---|---|---|---|---|
| 4,295,268 A | * | 10/1981 | Punshon et al. | 29/596 |
| 4,711,590 A | * | 12/1987 | Lakin | 384/206 |
| 5,554,015 A | * | 9/1996 | Dreiman et al. | 384/368 |
| 2004/0105601 A1 | * | 6/2004 | Honda et al. | 384/368 |
| 2005/0047690 A1 | * | 3/2005 | Keramati et al. | 384/368 |
| 2011/0299803 A1 | * | 12/2011 | Li et al. | 384/397 |

FOREIGN PATENT DOCUMENTS

JP  62-258218  * 11/1987

* cited by examiner

*Primary Examiner* — James Pilkington
(74) *Attorney, Agent, or Firm* — Matthias Scholl P.C.; Matthias Scholl

(57) ABSTRACT

A washer, including a central axial hole, a first oil retainer, a second oil retainer, and a transition groove. The central axial hole allows a motor shaft to pass therethrough. The first oil retainer and the second oil retainer are formed on the washer. The transition groove is disposed between the first oil retainer and the second oil retainer.

7 Claims, 5 Drawing Sheets

WASHER AND MOTOR BEARING SYSTEM COMPRISING THE SAME

CROSS-REFERENCE TO RELATED APPLICATIONS

This application is a continuation of International Patent Application No. PCT/CN2010/070299 with an international filing date of Jan. 21, 2010, designating the United States, now pending, and further claims priority benefits to Chinese Patent Application No. 200920054053.6 filed on Mar. 31, 2009. The contents of all of the aforementioned applications, including any intervening amendments thereto, are incorporated herein by reference.

BACKGROUND OF THE INVENTION

1. Field of the Invention

The invention relates to a washer, and a motor bearing system comprising the same.

2. Description of the Related Art

As shown in FIG. 1, a conventional motor bearing system is illustrated, and comprises an end cover 26, a rotating shaft 29, a bearing 27, an oil cap 28, an axial retaining ring 21, a positioning retaining ring 22, an adjusting retaining ring 23, a rubber washer 24, and a wear-resistant pad 25. An oil-storage groove 20 is disposed on the end cover 26, the positioning retaining ring 22, the adjusting retaining ring 23, the rubber washer 24, and the wear-resistant pad 25 are laminar, and radial dimension thereof is approximately the same. However, the structure has the following disadvantages: 1) the number of components is too large, which leads to complex structure, troublesome installation, and high cost; 2) during operation of the motor, the rotating shaft 29 rotates along with the axial retaining ring 21, the positioning retaining ring 22, the adjusting retaining ring 23, the rubber washer 24, and the wear-resistant pad 25, surface of the wear-resistant pad 25 is rough and not lubricant enough, and thus friction force generated as being contacted with contact surface, such as end surface of the end cover 26, and that of the bearing, is comparatively large, which leads to fast abrasion of the wear-resistant pad 25, and thus affecting work life of the whole system; 3) structure composed of the positioning retaining ring 22, the adjusting retaining ring 23, the rubber washer 4, the wear-resistant pad 25, and the oil cap 8 features poor oil retaining and return effect, and oil leakage often occurs, as lubricating oil keeps leaking and is not enough, lubricating effect of the bearing 27 becomes poor, which affects normal operation of the motor, reduces work life of the oil bearing, and causes failure of the motor.

SUMMARY OF THE INVENTION

In view of the above-described problem, it is an objective of the invention to provide a washer that is capable of addressing the above-mentioned problems.

It is another objective of the invention to provide a motor bearing system that is capable of addressing the above-mentioned problems.

To achieve the above objectives, in accordance with one embodiment of the invention, provided is a washer, comprising a central axial hole, a first oil retainer, a second oil retainer, and a transition groove, the central axial hole allows a motor shaft to pass therethrough, the first oil retainer and the second oil retainer are formed on the washer, and the transition groove is disposed between the first oil retainer and the second oil retainer.

In a class of this embodiment, at least one oil-storage groove is disposed on the surface of the first oil retainer.

In a class of this embodiment, the oil-storage groove is an annular groove, or a radial groove.

In a class of this embodiment, a diameter of the second oil retainer is greater than or equal to that of the first oil retainer, and the transition groove is an annular groove.

In a class of this embodiment, a first flange axially extends from the first oil retainer, and a second flange axially extends from the second oil retainer.

Advantages of the washer comprise: 1) the first oil retainer, the second oil retainer, and the transition groove formed on the washer have good oil retaining and return effect, and are capable of keeping lubricating oil in the bearing system of the motor for cyclic utilization, and preventing oil from entering a motor body, and thus ensuring normal operation of the motor, and improving work life thereof; 2) the washer has simple structure, operates to replace multiple components of a conventional bearing system, and features low production cost, and convenient installation; 3) the oil-storage groove is disposed on the surface of the first oil retainer of the washer, and allows oil film to be formed on the surface thereof, which reduces friction between the washer and contact surface, such as the end surface of the bearing, and that of the end cover, and thus abrasion is slight, and work life is greatly increased; 4) the second flange axially extending from the second oil retainer of the washer is combined with the retaining ring, and rotates along with the rotating shaft, which increases axial torsion applied on the rotating shaft, and no relative rotation occurs therebetween, which prevents redundant friction, and increases work life of the rotating shaft.

In accordance with another embodiment of the invention, provided is a motor bearing system using a washer, comprising a bearing, a rotating shaft, an end cover, an oil cap, a retaining ring, and a washer, comprising a central axial hole, a first oil retainer, a second oil retainer, and a transition groove, the bearing is disposed in a bearing house of the end cover, the rotating shaft abuts against the bearing, the washer is disposed on the rotating shaft, and on one end of the bearing, the retaining ring is buckled on the rotating shaft and axially positions the washer, an oil cap is disposed on periphery of the washer, the central axial hole allows a motor shaft to pass therethrough, the first oil retainer and the second oil retainer are formed on the washer, and the transition groove is disposed between the first oil retainer and the second oil retainer.

In a class of this embodiment, at least one oil-storage groove is disposed on the surface of the first oil retainer.

In a class of this embodiment, the oil-storage groove is an annular groove, or a radial groove.

In a class of this embodiment, a diameter of the second oil retainer is greater than or equal to that of the first oil retainer, and the transition groove is an annular groove.

In a class of this embodiment, a first flange axially extends from the first oil retainer, and a second flange axially extends from the second oil retainer.

Advantages of the motor bearing system comprise: 1) the invention has simple structure, and the washer operates to replace multiple components of a conventional bearing system, and features low production cost, and convenient installation; 2) the first oil retainer, the second oil retainer, and the transition groove formed on the washer have good oil retaining and return effect, and are capable of keeping lubricating oil in the bearing system of the motor for cyclic utilization, and preventing oil from entering a motor body, and thus ensuring normal operation of the motor, and improving work life thereof; 3) the oil-storage groove is disposed on the surface of the first oil retainer of the washer, and allows oil film to be formed on the surface thereof, which reduces friction between the washer and contact surface, such as the end surface of the bearing, and that of the end cover, and thus abrasion is slight, work life is greatly increased, and effective operation of the motor is ensured.

DETAILED DESCRIPTION OF THE EMBODIMENTS

Further description of the invention will be given below in conjunction with specific embodiments and accompanying drawings.

Figure 1:
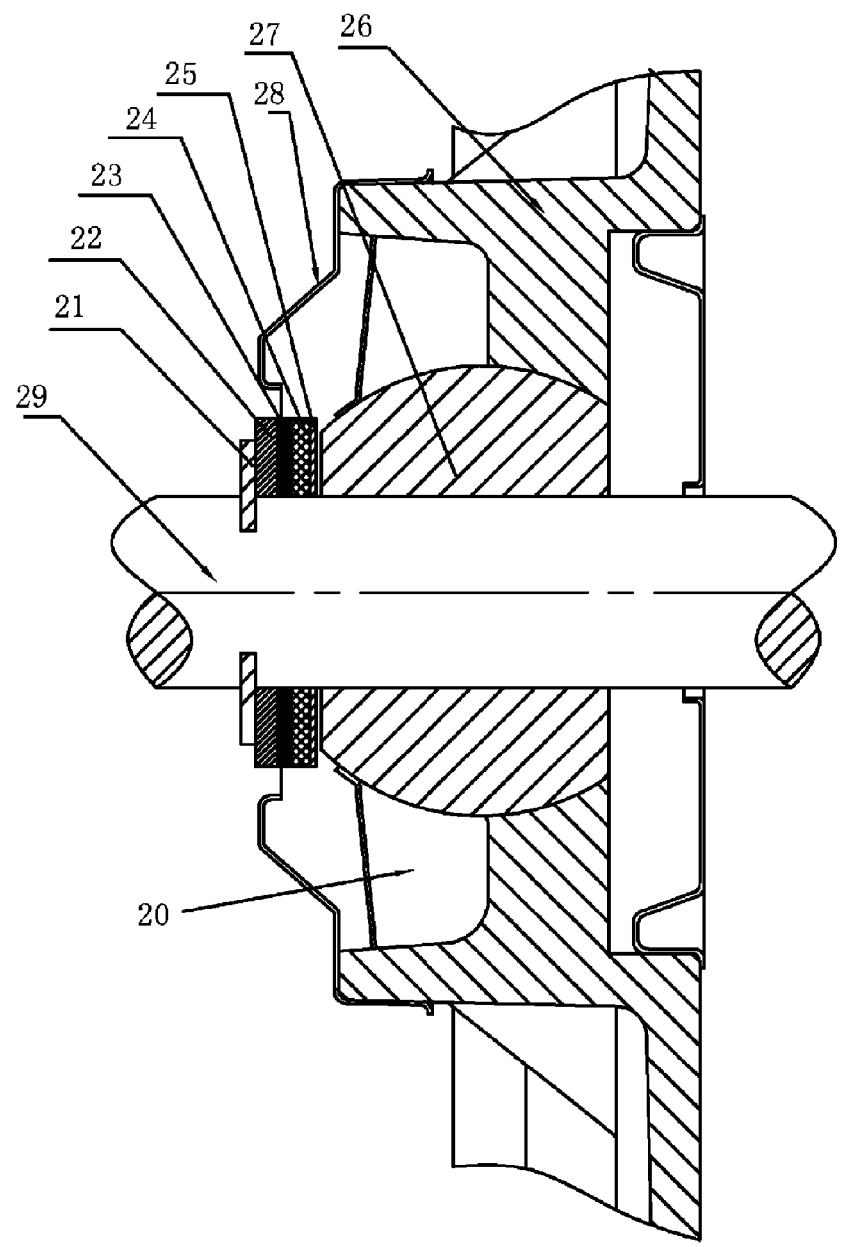
FIG. 1 is a schematic view of a motor bearing system in the prior art.
Figure 2:
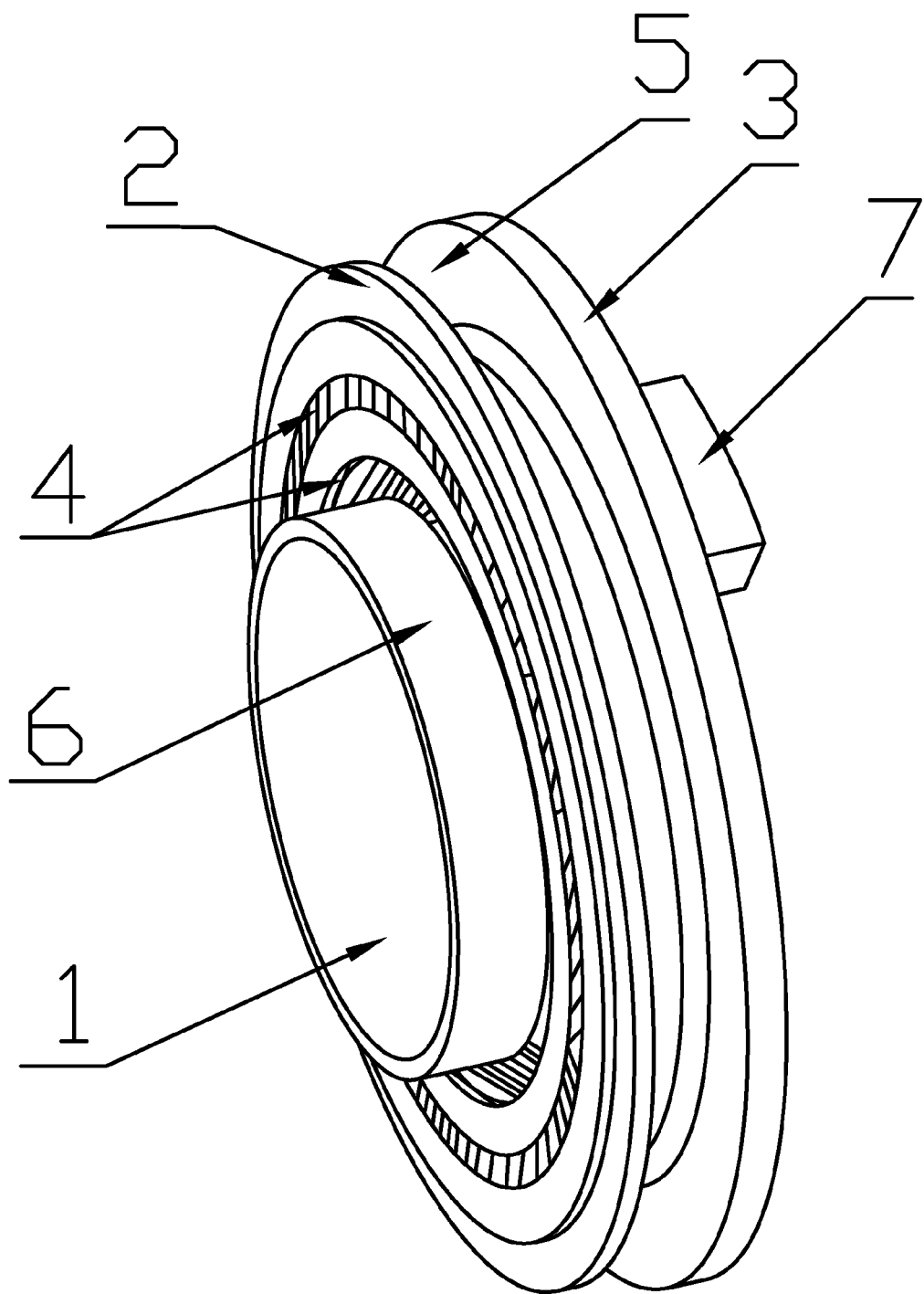
FIG. 2 is a perspective view of a washer of a first embodiment of the invention.
Figure 3:
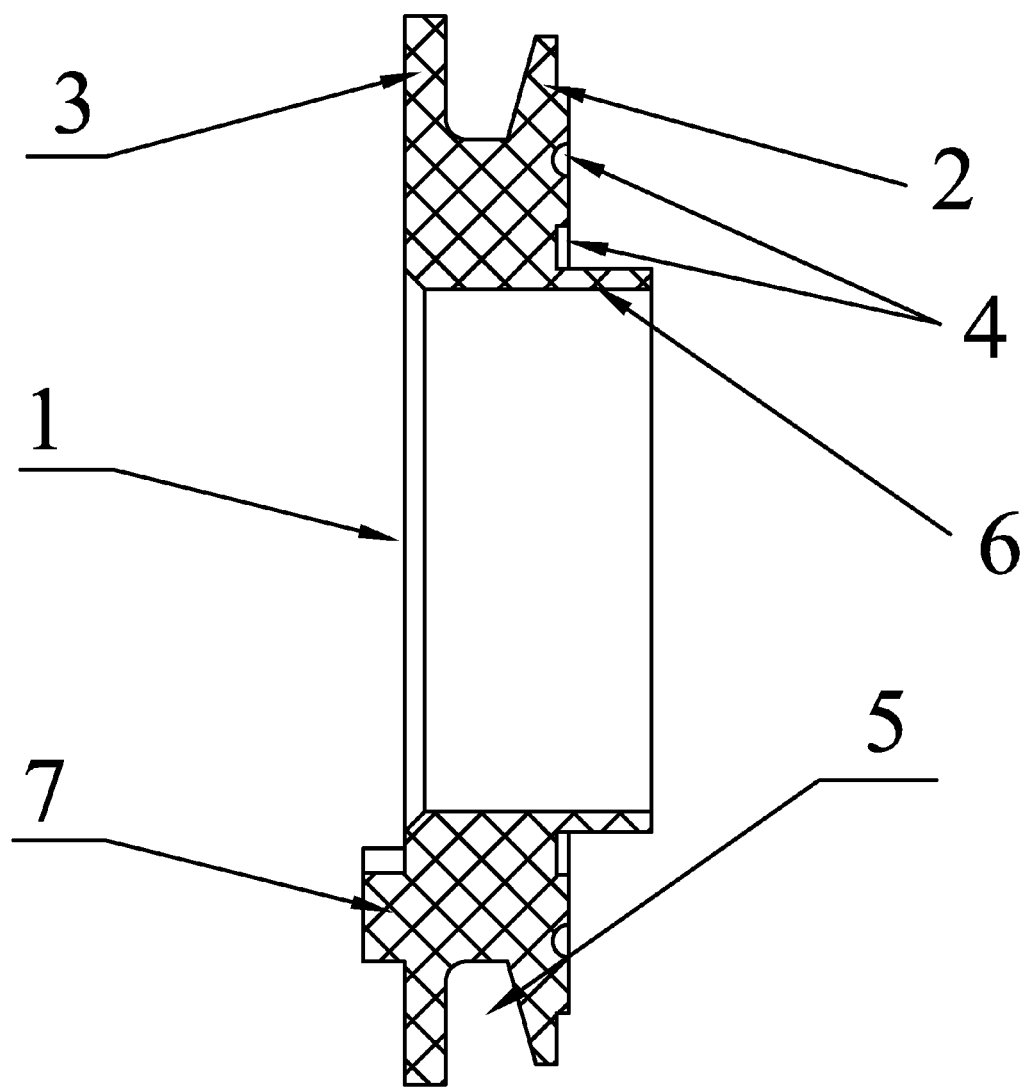
FIG. 3 is a cross-sectional view of a washer of a first embodiment of the invention.

As shown in FIGS. 2 and 3, a washer of the invention comprises a central axial hole 1, a first oil retainer 2, a second oil retainer 3, and a transition groove 5.

The central axial hole 1 allows a motor shaft to pass therethrough.

The first oil retainer 2 is formed on one side of the washer 8.

At least one oil-storage groove 4 is disposed on the surface of the first oil retainer 2. The oil-storage groove 4 is an annular groove.

The second oil retainer 3 is disposed at the back of the first oil retainer 2. A diameter of the second oil retainer 3 is greater than or equal to that of the first oil retainer 2, and a transition groove 5 is disposed between the first oil retainer 2 and the second oil retainer 3.

The transition groove 5 is an annular groove.

A first flange 6 axially extends from the first oil retainer 2, and a second flange 7 axially extends from the second oil retainer 3.

Figure 4:
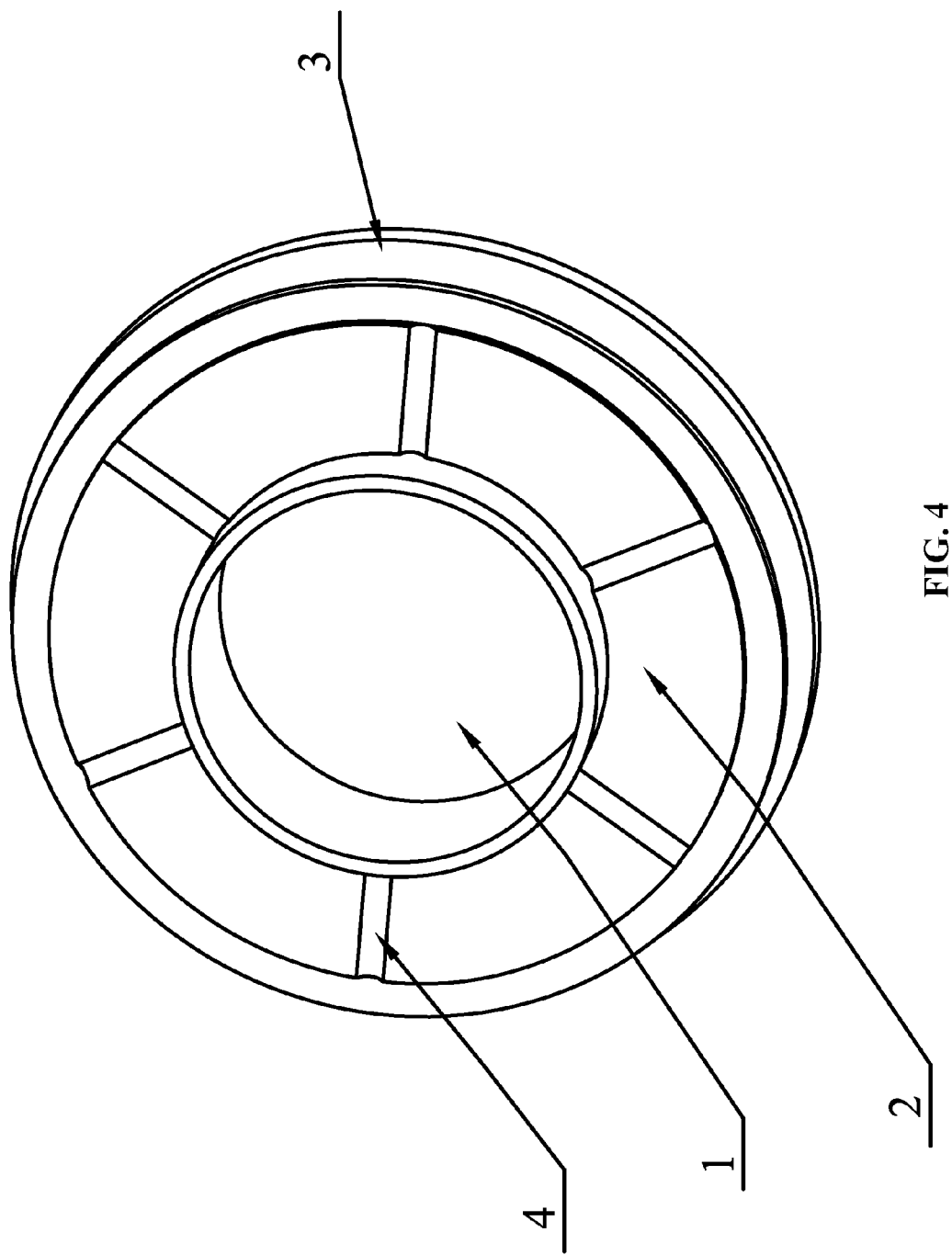
FIG. 4 is a perspective view of a washer of a second embodiment of the invention.

As shown in FIG. 4, the oil-storage groove 4 is a radial groove.

Figure 5:
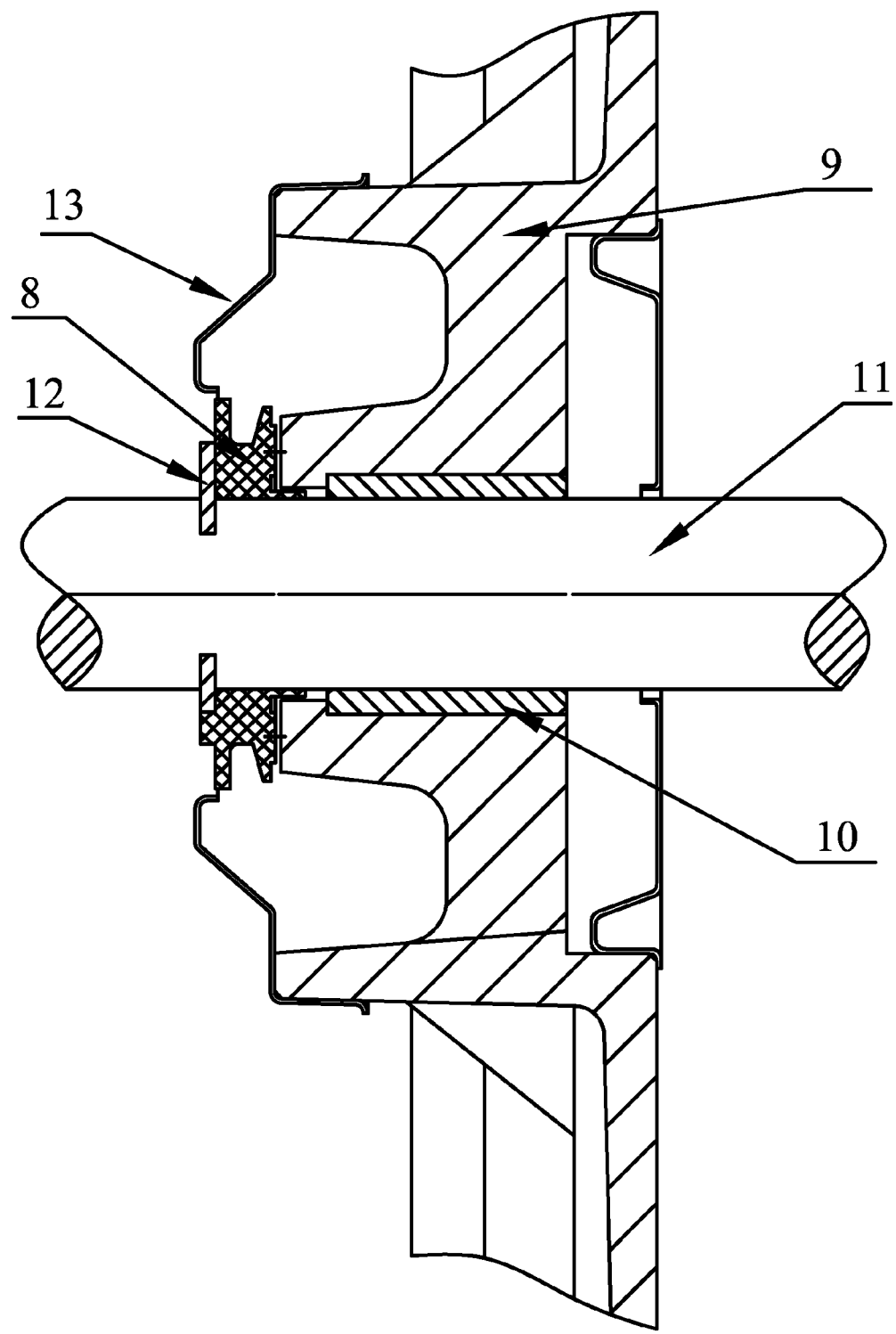
FIG. 5 is a cross-sectional view of a motor bearing system of the invention.

As shown in FIG. 5, a motor bearing system of the invention comprises a bearing 10, a rotating shaft 11, an end cover 9, an oil cap 13, a retaining ring 12, and a washer 8.

The bearing 10 is disposed in a bearing house of the end cover 9, and the rotating shaft 11 abuts against the bearing 10.

The washer 8 is disposed on the rotating shaft 11, and on one end of the bearing 10.

The retaining ring 12 is buckled on the rotating shaft 11 and axially positions the washer 8, and an oil cap 13 is disposed on periphery of the washer 8.

The surface of the first oil retainer 2 faces the bearing 10 and the end cover 9.

The oil cap 13 is connected to the end cover 9, the first oil retainer 2 is formed on one side of the washer 8 opposite to the oil bearing 10, and at least one oil-storage groove 4 is disposed on the surface of the first oil retainer 2.

A first flange 6 axially extends from the first oil retainer 2, and a second flange 7 axially extends from the second oil retainer 3.

The second flange 7 is combined with the retaining ring 12, and the retaining ring 12 axially positions the washer 8. During operation, the retaining ring 12 and the washer 8 rotate along with the rotating shaft 11.

The washer 8 is the same as that described with reference to FIGS. 2 and 3.

The washer composed of the first oil retainer 2, the second oil retainer 3, and the transition groove 5 features good oil retaining and return effect, enables lubricating oil to be cyclically utilized in the bearing system of the motor, and cooperates with the oil cap 13 to affectively prevent the lubricating oil from enter the motor body and affecting normal operation of the motor, which improve work life of the motor. The oil-storage groove 4 disposed on the surface of the first oil retainer 2 of the washer 8 allows oil film to be formed on the surface of the first oil retainer 2, which reduces friction as being contacted with other components and rotating with respect thereto, and thus abrasion is slight, and work life is greatly increased.

Operation of the invention is: as the rotating shaft operates and rotates at high speed, lubricating oil on the oil bearing axially flows over. The lubricating oil is firstly sprayed to the surface of the first oil retainer 2 of the washer 8, and part of the lubricating oil is stored in the oil-storage groove 4, and overflowing lubricating oil is axially thrown to inner wall of the oil cap 13 via the washer 8. As the first oil retainer 2 of the washer 8 cannot stop the overflowing fabricating oil, the overflowing fabricating oil is again axially thrown to the inner wall of the oil cap 13 by the second oil retainer 3. During this period, the transition groove 5 operates to buffer thrown oil, and to collect the lubricating oil. The lubricating oil thrown to the inner wall of the oil cap 13 flows back to the bearing system, which ensures good lubricity of the bearing system after a long time, and normal operation thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A washer, comprising:
    a central axial hole (1);
    a first oil retainer (2) having a first diameter;
    a second oil retainer (3) having a second diameter;
    a transition groove (5);
    a first flange (6); and
    a second flange (7);
wherein:
    said central axial hole (1) allows a motor shaft to pass therethrough;
    said first oil retainer (2) and said second oil retainer (3) are formed on said washer;
    said transition groove (5) is an annular groove and is disposed between said first oil retainer (2) and said second oil retainer (3);
    said second diameter is greater than said first diameter;
    said first flange (6) axially extends from said first oil retainer (2); and
    said second flange (7) axially extends from said second oil retainer (3).

2. The washer of claim 1, wherein at least one oil-storage groove (4) is disposed on the surface of said first oil retainer (2).

3. The washer of claim 2, wherein said oil-storage groove (4) is an annular groove, or a radial groove.

4. A motor bearing system using a washer, the motor bearing system comprising:
- a bearing (10);
- a rotating shaft (11);
- an end cover (9);
- an oil cap (13); and
- a retaining ring (12);
- the washer (8), comprising:
  - a central axial hole (1);
  - a first oil retainer (2) having a first diameter;
  - a second oil retainer (3) having a second diameter;
  - a transition groove (5);
  - a first flange (6); and
  - a second flange (7);

wherein:
- said bearing (10) is disposed in a bearing house of said end cover (9);
- said rotating shaft (11) abuts against said bearing (10);
- said washer (8) is disposed on said rotating shaft (11), and on one end of said bearing (10);
- said retaining ring (12) is buckled on said rotating shaft (11) and axially positions said washer (8);
- said oil cap (13) is disposed on periphery of said washer (8);
- said first oil retainer (2) and said second oil retainer (3) are formed on said washer (8);
- said transition groove (5) is an annular groove and is disposed between said first oil retainer (2) and said second oil retainer (3);
- said second diameter is greater than said first diameter;
- said first flange (6) axially extends from said first oil retainer (2);
- said second flange (7) axially extends from said second oil retainer (3); and
- said second flange (7) is combined with said retaining ring (12).

5. The motor bearing system of claim 4, wherein at least one oil-storage groove (4) is disposed on the surface of said first oil retainer (2).

6. The motor bearing system of claim 5, wherein said oil-storage groove (4) is an annular groove, or a radial groove.

7. A washer, comprising:
- a central axial hole (1);
- a first oil retainer (2) having a first diameter;
- a second oil retainer (3) having a second diameter;
- a transition groove (5);
- a first flange (6);
- a second flange (7); and
- at least two oil-storage grooves (4);

wherein:
- said central axial hole (1) is adapted to pass a motor shaft therethrough;
- said first oil retainer (2) and said second oil retainer (3) are formed on said washer;
- said at least two oil-storage grooves (4) are annular grooves;
- said second diameter is greater than said first diameter;
- said transition groove (5) is an annular groove and is disposed between said first oil retainer (2) and said second oil retainer (3);
- said first flange (6) axially extends from said first oil retainer (2); and
- said second flange (7) axially extends from said second oil retainer (3).

* * * * *